United States Patent
Tondu

(10) Patent No.: US 11,472,163 B2
(45) Date of Patent: Oct. 18, 2022

(54) HEATING GLAZING MADE OF A STRUCTURAL PLASTIC MATERIAL

(71) Applicant: SAINT-GOBAIN GLASS FRANCE, Courbevoie (FR)

(72) Inventor: Thomas Tondu, Saint-Martin-D'Abbat (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 45 days.

(21) Appl. No.: 16/769,487

(22) PCT Filed: Dec. 11, 2018

(86) PCT No.: PCT/FR2018/053205
§ 371 (c)(1),
(2) Date: Jun. 3, 2020

(87) PCT Pub. No.: WO2019/115932
PCT Pub. Date: Jun. 20, 2019

(65) Prior Publication Data
US 2020/0384741 A1 Dec. 10, 2020

(30) Foreign Application Priority Data
Dec. 13, 2017 (FR) ...................................... 1771348

(51) Int. Cl.
*B32B 17/10* (2006.01)
*B32B 3/00* (2006.01)
*B32B 3/02* (2006.01)

(52) U.S. Cl.
CPC .......... *B32B 17/10761* (2013.01); *B32B 3/00* (2013.01); *B32B 3/02* (2013.01); *B32B 17/10036* (2013.01); *B32B 17/1077* (2013.01); *B32B 17/10174* (2013.01); *B32B 2250/04* (2013.01); *B32B 2250/05* (2013.01);
(Continued)

(58) Field of Classification Search
CPC ....... B32B 3/00; B32B 3/02; B32B 17/10761; B32B 17/10036; B32B 17/10174; B32B 17/1077; B32B 2250/04; B32B 2250/05; B32B 2307/302; B32B 2307/412; B32B 2551/00; B32B 2605/18; B64C 1/14;
(Continued)

(56) References Cited

U.S. PATENT DOCUMENTS

| 4,321,296 A | * | 3/1982 | Rougier | ............ B32B 17/10018 428/212 |
| 2008/0318011 A1 | * | 12/2008 | Chaussade | ........ B32B 17/10045 428/210 |
| 2018/0208293 A1 | * | 7/2018 | Ton | ........................ B64C 1/1484 |

FOREIGN PATENT DOCUMENTS

| EP | 0 007 857 A1 | 2/1980 |
| WO | WO 2017/001792 A1 | 1/2017 |

OTHER PUBLICATIONS

International Search Report as issued in International Patent Application No. PCT/FR2018/053205, dated Mar. 25, 2019.

* cited by examiner

*Primary Examiner* — Catherine A. Simone
(74) *Attorney, Agent, or Firm* — Pillsbury Winthrop Shaw Pittman LLP

(57) ABSTRACT

A heated glazing includes at least one plastic structural substrate and a heating device and includes at least one transparent and electrically-conductive thin layer. The heated glazing includes, as laminate, at least one first plastic structural substrate, at least one glass sheet equipped with the heating layer, and at least one second plastic structural substrate.

23 Claims, 1 Drawing Sheet

(52) U.S. Cl.
CPC ... *B32B 2307/302* (2013.01); *B32B 2307/412* (2013.01); *B32B 2551/00* (2013.01); *B32B 2605/18* (2013.01)

(58) Field of Classification Search
CPC ....... B64C 1/1484; B64C 1/1492; H05B 3/84; H05B 3/86; H05B 2203/013; B60J 1/002
See application file for complete search history.

HEATING GLAZING MADE OF A STRUCTURAL PLASTIC MATERIAL

CROSS-REFERENCE TO RELATED APPLICATIONS

This application is the U.S. National Stage of PCT/FR2018/053205, filed Dec. 11, 2018, which in turn claims priority to French patent application number 1771348 filed Dec. 13, 2017. The content of these applications are incorporated herein by reference in their entireties.

FIELD

The invention relates to a heated glazing based on structural plastic.

The invention will more particularly be described with regard to a heated glazing for use in the aeronautical field, without however being limited thereto.

BACKGROUND

An airplane glazing may incorporate heating means in order to prevent the phenomena of icing on the external face or of misting on the internal face. The heating means are intended for Joule heating, either through a network of very thin wires, or through a transparent electrically-conductive layer.

The side glazings of an airplane are often made of plastic with several sheets of plastic and heating means incorporated into the plastic.

The use of heating wires in a plastic glazing is not optimal. Specifically, the heating wires, subjected to cyclic mechanical stresses such as expansion of the glazing, or pressurization of the airplane, tend to break, which limits the lifetime of the glazings. Furthermore, due to the low thermal conductivity of plastic glazings, the heat dissipated by each wire is drained with difficulty which leads to optical haze phenomena on heating.

As regards heating layers deposited on plastic, they are industrially tedious to manufacture due to the fact that it is necessary to deposit a varnish before the deposition of the metal layers (the metallization) for smoothing the deposition surface of the layers and improving the adhesion of the metallization. Furthermore, the deposition of varnish requires an extremely clean environment, and also thermal crosslinking steps which are complex to control.

The heating layers may furthermore be deposited under vacuum. However, vacuum depositions on plastic are limited to low temperatures. Gold is often chosen for heating layers on plastic, since it can be deposited cold and is not very brittle due to its natural ductility; nevertheless, gold-based layers degrade the light transmission through the glazing and give rise to a yellow appearance. Furthermore, the manufacturing cycles of glazing with vacuum deposition are lengthened by the degassing of the plastics.

Finally before laminating the various sheets of plastic, since the metallized sheets are relatively brittle and susceptible to scratching, drastic handling and assembly conditions are imposed.

SUMMARY

The objective of the invention is therefore to provide a heated glazing which, although made of structural plastic, does not have the aforementioned drawbacks.

According to the invention, the heated glazing based on structural rigid plastic comprises at least one plastic structural substrate and heating means intended to provide Joule heating with a view to deicing and/or demisting the glazing, and is characterized in that it comprises, as laminate, at least one first plastic structural substrate, at least one glass sheet equipped with the heating means, and at least one second plastic structural substrate.

Thus, the glazing has the advantage of being structurally made of plastic, without having the abovementioned drawbacks of manufacturing the heating means to be combined with the plastic, owing to the fact that the heating means are deposited previously on glass which is then laminated between the two plastic substrates. The glass sheet forms the heating support of the glazing.

According to one feature, the glass sheet has surface dimensions smaller than those of the two plastic structural substrates.

According to another feature, the two structural substrates are spaced apart from one another and are joined by a transparent plastic intermediate layer for instance made of polyvinyl butyral (PVB) or of TPU (thermoplastic polyurethane). The glass sheet is in particular joined by said plastic intermediate layer; it is thus encapsulated in the plastic that joins together the structural substrates, in particular the thickness of said plastic intermediate layer being between 1.2 and 5 mm, preferably between 2.5 and 4 mm.

The glass sheet is joined to each of the plastic structural substrates via a single-layer or multilayer plastic film for instance made of PVB or TPU.

Preferably, the plastic structural substrates each have a thickness of between 5 and 25 mm.

The plastic structural substrates are for example made of PMMA (polymethyl methacrylate), or PU (polyurethane) or PC (polycarbonate).

Advantageously, the glass sheet is thin, it has a thickness of between 0.5 and 1.6 mm, preferably between 0.5 mm and 0.7 mm.

Advantageously, the heating means comprise at least one transparent and electrically-conductive thin layer. The use of a heating layer enables a better distribution of the heating, provides perfect transparency and prevents any haze effect compared to metal wires, and finally provides an increased lifetime of the glazing. The electrically-conductive layer is for example based on tin oxide, or on tin oxide doped with indium or with fluorine, or else based on metal in particular of gold and/or silver type. The thickness of the layer is in particular between 50 and 500 nm.

Preferably, the heating layer is based on ITO, which makes it possible to obtain optimal conductivities by a high-temperature deposition or by subsequent annealing of the glass withstanding these temperatures.

In one particular embodiment, the glazing comprises two sheets consisting of the two plastic structural substrates and between which the glass sheet is laminated, and at least one third sheet, in particular intended to be the outermost of the sheets of the glazing and facing the outside environment in the usage/assembled position of the glazing in its final destination, said third sheet being either made of plastic, in particular with a thickness of between 1 and 3 mm, or forms a glass substrate preferably made of reinforced glass (which is reinforced by a thermal or chemical tempering), in particular having a thickness of between 0.5 and 5 mm, preferentially between 1.5 and 3 mm. The third sheet is in particular added/joined to one of the structural substrates via a joining interlayer layer made of PU-type plastic. Preferably, the surface dimensions of said third sheet are smaller than those of the structural substrate with which it is combined.

Preferably, the glazing comprises at least one temperature probe arranged between the two plastic structural substrates, by being either joined to the glass sheet on the opposite face to the one equipped with the electrically-conductive layer, or arranged in the thickness of interlayer material separating the two plastic structural substrates.

The use of a thin glass advantageously makes it possible to place a temperature sensor of variable resistance type against the glass on the opposite face to the heating layer. The glass then acts as an electrical insulator while being a good heat conductor. This enables accurate control of the temperature of the heating layer while preventing the risks of short circuits.

The glazing according to the present invention may also comprise at least one functional thin layer other than the heating layer, for example a layer for solar protection or an electrochromic layer, it being possible for several of these functional thin layers to be in the form of a stack of layers. The functional layer could be applied on the non-heating face of the thin glass, but in such a case the temperature probe would be instead in the plastic intermediate layer and not combined with the functional layer. As a variant, the glazing could comprise a second glass sheet laminated with the first glass sheet between the two plastic structural substrates, and provided with the functional layer.

According to one particular feature, the whole of the periphery of the glazing forms, depending on the thickness of said glazing, an extended frame consisting solely of plastic, which enables the fastening of the glazing like any standard plastic glazing requiring a perforation in the thickness thereof.

Preferably, the glazing comprises an outermost sheet that is designed to make a peripheral shoulder intended to house a portion of the structure that receives the glazing.

The glazing may be used in an aircraft, in particular as a side window, in particular as an airplane cockpit side window.

In the remainder of the description, the qualifiers "outer" and "inner" are used within the context of a normal fitting of the glazing in a cockpit, with one face oriented toward the environment outside the cockpit and one face oriented toward the inside of the cockpit.

BRIEF DESCRIPTION OF THE DRAWINGS

The present invention is now described with the aid of examples that are purely illustrative and in no way limit the scope of the invention, and using the appended drawings, in which.

DETAILED DESCRIPTION

Figure 1:
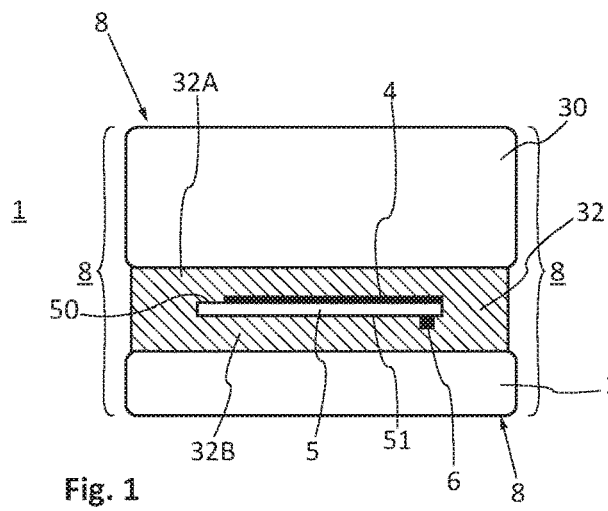
FIG. 1 represents a schematic cross-sectional view of a heated glazing according to the invention.
Figure 2:
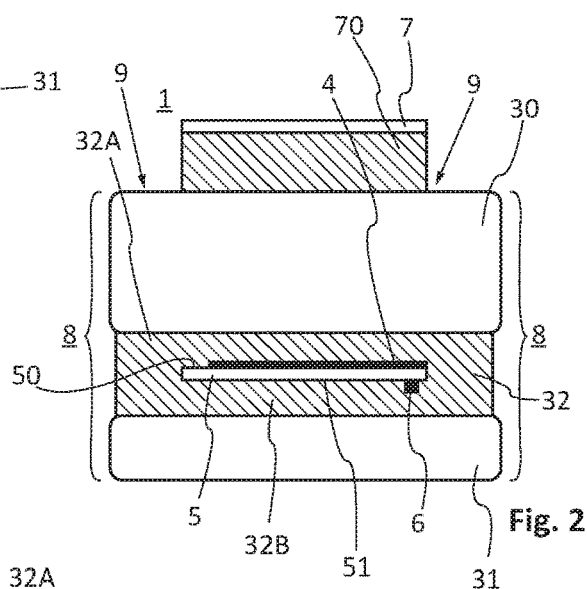
FIGS. 2 and 3 are schematic cross-sectional views of two respective embodiment variants of the glazing from FIG. 1.
Figure 3:
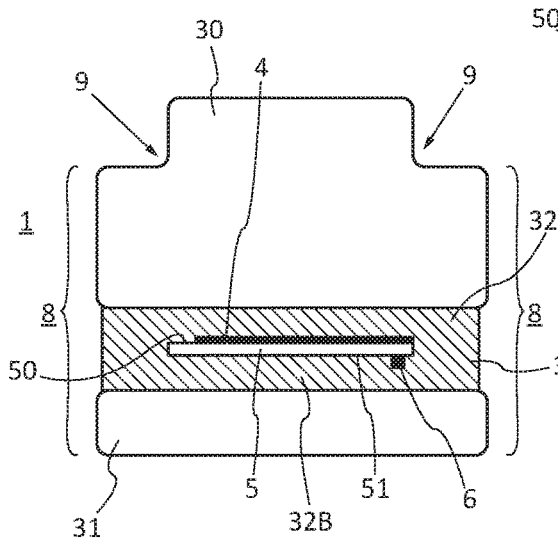
Figure 4:
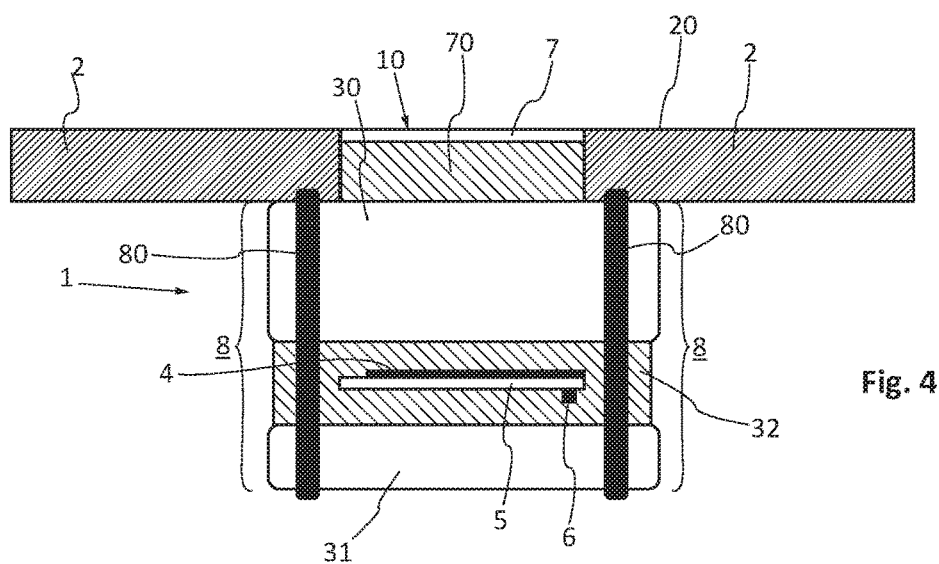
FIG. 4 is a schematic cross-sectional view of the glazing from FIG. 2 fastened in a cockpit, such as an airplane structure.

The heated glazing 1 of the invention illustrated in FIGS. 1 to 3 is intended to be fastened to the structure 2 of an airplane cockpit, as represented in FIG. 4 to form in particular a side window.

According to the invention, the heated glazing 1 comprises at least two transparent plastic structural substrates 30 and 31, an interlayer layer 32 of transparent thermoplastic connecting the two structural substrates, heating means 4 advantageously comprising a transparent electrically-conductive layer, and a support 5 for said heating means, said support 5 being embedded in the interlayer layer 32 and formed according to the invention by a thin glass sheet.

The structure 2 of the airplane has a face referred to as the outer face 20 oriented toward the environment outside of the airplane.

The two transparent plastic structural substrates 30 and 31 are for example made of PMMA. The structural substrate 30, referred to as the outer substrate since it is oriented toward the outside of the airplane, preferably has a thickness for example of 14 mm, which is greater than that of the structural substrate 31, referred to as the inner substrate since it is oriented toward the inside, having a thickness of 6 mm for example.

The intermediate layer 32 which makes it possible to join the two structural substrates is for example made of PVB or TPU. It has, for example, a thickness of 3.1 mm. There are at least two films of PVB film type in order to incorporate the thin glass sheet 5 into the glazing and join it.

The glass sheet 5 is therefore laminated between the two structural substrates 30 and 31 by means of the intermediate layer 32. The glass sheet 5 is joined by one of its faces 50 to the outer structural substrate 30 via a single-layer or multilayer PVB film 32A, and by its opposite face 51 to the outer structural substrate 31 via a second single-layer or multilayer PVB film 32B.

According to the invention, the thin glass sheet 5 forms a means of support for the deposition of the heating layer 4.

The thin glass sheet has for example a thickness of 0.7 mm.

The transparent electrically-conductive layer 4 is a thin layer deposited in a known manner on the glass, for example by PVD (physical vapor deposition) or CVD (chemical vapor deposition). Preferably, the layer is based on a doped oxide, such as ITO. It has, for example, a thickness of between 50 and 800 nm.

The heating layer covers all or some of one of the faces 50 of the glass sheet. The glass sheet 5, with its heating layer 4, is positioned in the glazing so that the heating layer 4 is facing the outer structural substrate 30.

The heating layer 4 is connected to current supply collectors or strips, not illustrated here, intended to be connected to a current source external to the glazing.

Advantageously, the glazing comprises at least one temperature probe 6 which is preferably arranged on the glass sheet 5, in particular on the face 51 of the glass sheet opposite the face 50 bearing the heating layer 4. The temperature probe comprises for example, in a known manner, thin wires of variable resistance. As a variant, the temperature probe could be placed in the thickness of the interlayer layer 32.

In the embodiment example represented in FIG. 2, the glazing 1 comprises a third sheet 7 on the outside of the glazing and therefore of the airplane. This sheet is formed of a third rigid substrate, for example with a thickness of between 1 and 3 mm, being either made of rigid plastic, such as PMMA, or made of reinforced glass (which is reinforced by thermal or chemical tempering). This third sheet 7 is joined to the outer face of the outer structural substrate 31 via a transparent plastic interlayer 70, for instance made of PU, for example with a thickness of 5 mm. The glazing of this example thus has more sheets than the embodiment example from FIG. 1, and the thickness thereof is also greater.

In the embodiment example from FIG. 3, the glazing 1 comprises only two sheets which correspond to the plastic structural substrates 30 and 31, but the thickness of the outer substrate 30, in particular made of 18 mm PMMA, is increased relative to that of the example from FIG. 1.

For the manufacture of the glazing, each structural substrate 30 and 31, the thin glass 5 (before deposition of the heating layer 4), the additional substrate 7 and the interlayer 70 are produced to the desired dimensions and shapes, then each constituent element of the glazing, structural substrates, thin glass 5 covered with the heating layer, optionally additional substrate and the interlayer thereof, and also the joining elements which are in particular the films 32A and 32B, are deposited on one another as a laminate, and finally the assembly is passed into an autoclave. As a variant, the final dimensioning of the plastic structural substrates 30 and 31 may be carried out after autoclaving, by cutting them to the desired dimensions.

To ensure the fastening of the glazing 1 of the invention in the structure of the airplane (FIG. 4), the glass sheet 5 inside the thickness of the glazing (FIGS. 1 to 3) and the third sheet 7 and its interlayer 70 for the example from FIG. 2 have surface dimensions which are smaller than the surface dimensions of the plastic structural substrates 30 and 31, in order to provide an extended peripheral frame 8 entirely made of plastic for the entire thickness of the glazing so that fixing means 80 pass solely through the plastic, as depicted in FIG. 4.

Moreover, in order to incorporate the glazing into the structure of the airplane so that the outer face 10 of the glazing 1 is coplanar with the outer face 20 of the structure of the airplane (FIG. 4), the third sheet 7 and its interlayer 70 of the embodiment example from FIG. 2 have surface dimensions smaller than those of the outer structural substrate 30, and the outer structural substrate 30 from FIG. 3 itself has a suitable shape for providing an outer peripheral shoulder 9, in which the thickness of the cabin 2 of the airplane is housed.

Of course, seals not illustrated here are provided between the glazing and the structure of the airplane.

The invention claimed is:

1. A heated glazing comprising, as laminate, at least one first plastic structural substrate, at least one glass sheet equipped with a heating device, at least one second plastic structural substrate and an intermediate layer that joins together the at least one first plastic structural substrate and the at least one second plastic structural substrate, wherein the at least one glass sheet equipped with the heating device is encapsulated in the intermediate layer.

2. The glazing as claimed in claim 1, wherein the at least one glass sheet has surface dimensions smaller than those of the first and second plastic structural substrates.

3. The glazing as claimed in claim 1, wherein the first and second plastic structural substrates are spaced apart from one another and wherein the intermediate layer includes a transparent plastic intermediate layer made of polyvinyl butyral (PVB) or polyurethane (PU) between 1.2 and 5 mm.

4. The glazing as claimed in claim 1, wherein the glass sheet is joined to each of the plastic structural substrates via a single-layer or multilayer plastic film made of polyvinyl butyral (PVB) or polyurethane (PU).

5. The glazing as claimed in claim 1, wherein the first and second plastic structural substrates each have a thickness of between 5 and 25 mm.

6. The glazing as claimed in claim 1, wherein the plastic structural substrates are made of polymethyl methacrylate (PMMA), or polyurethane (PU) or polycarbonate (PC).

7. The glazing as claimed in claim 1, wherein the glass sheet has a thickness of between 0.5 and 1.6 mm.

8. The glazing as claimed in claim 1, wherein the heating device comprises at least one transparent and electrically-conductive layer.

9. The glazing as claimed in claim 1, comprising two sheets consisting of the first and second plastic structural substrates and between which the glass sheet is laminated, and at least one third sheet, which is the outermost of the sheets of the glazing and facing the outside environment in the usage position of the glazing in its final destination, said third sheet being either made of plastic or forms a glass substrate.

10. The glazing as claimed in claim 8, wherein the glass sheet has a first face equipped with the transparent and electrically-conductive layer and a second face that is opposite to the first face, the glazing further comprising at least one temperature probe arranged between the first and second plastic structural substrates, by being either joined to the glass sheet on second face of the glass sheet that is opposite to the first face, or arranged in a thickness of interlayer material separating the two plastic structural substrates.

11. The glazing as claimed in claim 1, wherein a whole periphery of the glazing forms, depending on a thickness of said glazing, an extended frame consisting solely of plastic.

12. The glazing as claimed in claim 1, comprising an outermost sheet that is configured to make a peripheral shoulder intended to house a portion of a structure-that receives the glazing.

13. The glazing as claimed in claim 1, wherein the glazing is arranged in an aircraft.

14. The glazing as claimed in claim 3, wherein a thickness of said plastic intermediate layer is between 2.5 and 4 mm.

15. The glazing as claimed in claim 7, wherein the thickness of the glass sheet is between 0.5 and 0.7 mm.

16. The glazing as claimed in claim 8, wherein the electrically-conductive layer is based on tin oxide, or on tin oxide doped with indium or with fluorine, or based on metal.

17. The glazing as claimed in claim 9, wherein the thickness of the third sheet is between 1 and 3 mm.

18. The glazing as claimed in claim 9, wherein the glass substrate is a reinforced glass having a thickness of between 0.5 and 5 mm.

19. The glazing as claimed in claim 9, wherein the third sheet is joined to one of the structural substrates via a joining interlayer layer made of polyurethane (PU) plastic.

20. The glazing as claimed in claim 9, wherein surface dimensions of said third sheet are smaller than those of a structural substrate with which it is combined.

21. The glazing as claimed in claim 13, wherein the glazing forms an airplane cockpit side window.

22. The glazing as claimed in claim 1, wherein the intermediate layer includes a plurality of films.

23. The glazing as claimed in claim 22, wherein the plurality of films are plastic films.

* * * * *